J. McKECHNIE.
FABRIC FOR GAS BAGS OF AIRCRAFT AND METHOD OF MANUFACTURING THE SAME.
APPLICATION FILED JULY 6, 1917.
1,301,955.
Patented Apr. 29, 1919.
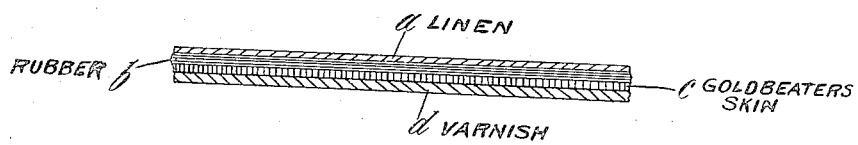
Inventor:
James McKechnie

UNITED STATES PATENT OFFICE.

JAMES McKECHNIE, OF BARROW-IN-FURNESS, ENGLAND, ASSIGNOR TO VICKERS LIMITED, OF WESTMINSTER, ENGLAND.

FABRIC FOR GAS-BAGS OF AIRCRAFT AND METHOD OF MANUFACTURING THE SAME.

1,301,955.     Specification of Letters Patent.     Patented Apr. 29, 1919.

Application filed July 6, 1917. Serial No. 179,041.

*To all whom it may concern:*

Be it known that I, JAMES McKECHNIE, a subject of the King of Great Britain, residing at Naval Construction Works, Barrow-in-Furness, in the county of Lancaster, England, have invented certain new and useful Improvements in Fabrics for the Gas-Bags of Aircraft and Methods of Manufacturing the Same, of which the following is a specification.

This invention relates to the manufacture of fabrics for the gasbags of airships or balloons, and of the kind wherein goldbeater's skin forms a component, the chief object being to obtain the necessary gas tight properties with a substantial reduction in weight as compared with the fabrics at present employed. Hitherto it has been found necessary to employ several layers of the skin and in a previous proposal several layers were united under pressure by means of a gelatin solution and the resulting material impregnated with a celluloid solution applied to both sides, either side or both sides being then covered with an adhering fabric, if required.

According to one part of this invention a single layer of goldbeater's skin is employed as a lining for the basic material (usually a rubber proofed cotton fabric) and after the skin has been applied and dried the surface of the skin is varnished with a linseed oil or similar varnish. This varnish forms a film on the surface of the skin and is prevented from penetrating into the woven fabric by the single layer of skin while at the same time it forms a highly efficient gas tight layer of extremely light weight, taking the place of the second layer of goldbeater's skin which is at present employed in a well known method of lining the basic woven fabric.

A further economy of weight is obtained in accordance with a second part of this invention, in which the woven fabric instead of consisting of a rubber proofed cotton material is made of fine linen, which should be manufactured from the best flax fiber, the linen fabric being proofed in a manner which does not reduce its strength. For example, the fabric may be proofed with rubber, cellulose, cellulose esters, or other suitable proofing substance. When the fabric is proofed with rubber the latter must be left unvulcanized or vulcanized at a sufficiently low temperature to avoid impairing the fabric.

A suitable method of manufacture will now be described with reference to the accompanying drawing showing a magnified section of the fabric.

Thus, a single ply of linen fabric $a$ is coated with a layer of unvulcanized rubber $b$ in the usual manner on a spreading machine, the rubber, after drying, being then coated with French chalk to prevent adhesion while working the material. Goldbeater's skin $c$ is then spread over it, after treating with naphtha or rubber solution, the skin lining being applied in a single layer which is coated with a thin film of varnish $d$.

With fabric made according to the first part of the invention it has been found that a saving of about 25 grams per square meter is obtained as against the method heretofore largely used of two layers of goldbeater's skin, while an equally good result as regards gas-tightness is obtained.

The linen fabric $a$ is found to be about 20 per cent. stronger in tension than a cotton fabric of the same weight and has a greater resistance to tearing so that for the same strength a considerable reduction in weight is obtainable, especially if both the proposals are embodied in the same fabric, thus a saving in weight of about 70 grams per square meter over what has at present been adopted for rigid airships may be effected. This represents about one ton increase of lift in an airship of about a million cubic feet capacity.

What I claim and desire to secure by Letters Patent of the United States is:—

1. The herein described method of manufacturing fabric for the gasbags of airships or balloons which consists in proofing a fabric to constitute a basic material, applying a single layer of goldbeater's skin as a lining for the basic material, and varnishing the exposed side of the said layer.

2. The herein described method of manufacturing fabric for the gasbags of airships or balloons which consists in coating a linen fabric with rubber, applying a layer of goldbeater's skin to the said fabric, drying the surface of the skin and varnishing said surface with linseed oil.

3. The herein described method of manufacturing fabric for the gasbags of airships or balloons which consists in coating a single ply of linen fabric with a layer of unvulcanized rubber, drying said rubber, coating it with French chalk, applying to said fabric goldbeater's skin previously treated with naphtha and coating with a thin film of varnish.

4. The herein described method of manufacturing fabric for the gasbags of airships or balloons which consists in proofing a linen fabric with rubber at a sufficiently low temperature to avoid impairing the fabric, coating said rubber with French chalk, applying a lining of goldbeater's skin previously treated with a rubber solution to said linen fabric and varnishing said lining.

5. A fabric for the gasbags of airships or balloons comprising a basic material of linen, a single layer of goldbeater's skin forming a lining to said material and a film of varnish applied to the exposed side of the said lining.

6. A fabric for the gasbags of airships or balloons comprising a basic material of linen, goldbeater's skin forming a lining and a film of varnish applied to said lining.

In testimony whereof I affix my signature.

JAMES McKECHNIE.